UNITED STATES PATENT OFFICE.

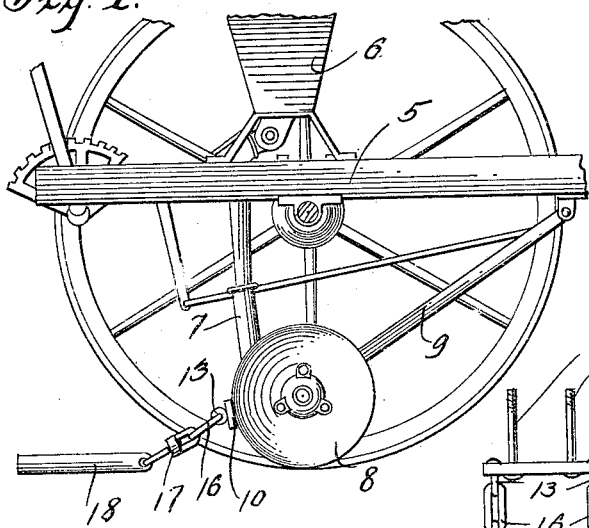
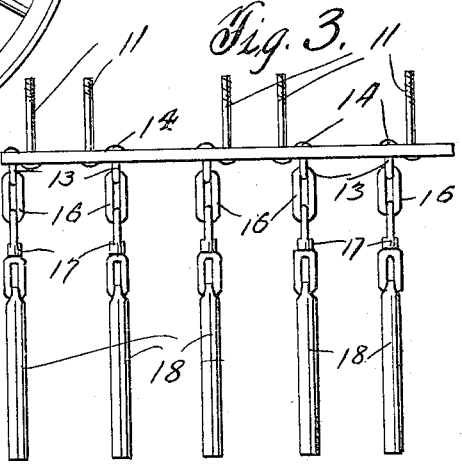
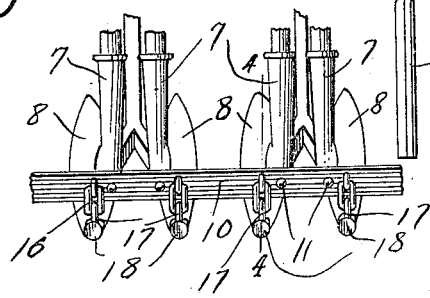
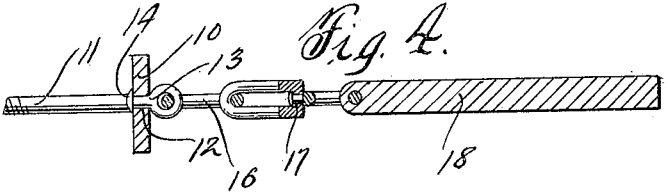

ALBERT C. LARSON, OF NEW CAMBRIA, KANSAS.

COVERING ATTACHMENT FOR DRILLS.

1,272,466.  Specification of Letters Patent.  Patented July 16, 1918.

Application filed August 21, 1917. Serial No. 187,420.

*To all whom it may concern:*

Be it known that I, ALBERT C. LARSON, a citizen of the United States, residing at New Cambria, in the county of Saline, State of Kansas, have invented certain new and useful Improvements in Covering Attachments for Drills; and I do hereby declare the following to be a full, clear, and exact description of the invention, such as will enable others skilled in the art to which it appertains to make and use the same.

This invention is an improvement in agricultural machines and has particular reference to a coverer attachment for seed drills.

An object of the invention is to provide a simple and inexpensive attachment adapted to be applied to a seed drill and extended rearwardly of the disks and seed boots whereby to cover the furrow in which the seed has been deposited and also pack the earth over the seed in such manner that the crop will grow uniformly and be improved in other respects.

The inventive idea involved is capable of receiving a variety of mechanical expressions, one of which, for the purpose of illustrating the invention, is shown in the accompanying drawing, wherein:—

Figure 1 is a fragmentary side elevation of a seed drill showing the covering attachment applied thereto.

Fig. 2 is a rear elevation.

Fig. 3 is a detail plan view of the attachment.

Fig. 4 is a longitudinal section through one of the covering elements and its connections.

In the drawing, the numeral 5 indicates the frame of a seed drill of ordinary construction having the usual hopper 6 through which the seed is fed to the boots 7 with which are associated the disks 8 carried by the usual drag bars 9 pivoted to the frame.

The covering attachment which comprises the essential feature of the invention, preferably consists of a supporting bar 10 having the bolts or other fastening means 11 extending forwardly therefrom and adapted for attachment with the seed boots 7 in such a manner that the bar 10 will extend transversely of the boots in a horizontal plane. The bar 10 is provided with a longitudinal row of spaced openings 12 for receiving the swivels 13 provided with the heads 14 for retaining the same in position on the bar. To the swivels 13 are connected the links 16 and other swivels 17 are also connected to the links 16, and these last named swivels carry the covering elements 18 preferably in the form of elongated cylindrical weights which are adapted to drag along the ground during the progress of the machine rearwardly of the seed boots and disks so as to cover the furrow made by the disks after the seed have been deposited therein. Owing to the swivel connections between the weights 18 and bar 10 it will be apparent that these weights may be turned about their longitudinal axes when the same strike obstructions on the ground thus having a tendency to roll the weights and cause the packing of the earth over the seed furrow whereby the ground will be made substantially level. This fact will insure a better crop of wheat since the same will then grow to a uniform height.

What is claimed is:—

In a seed drill, the combination with the seed boots thereof; of a supporting bar secured to said seed boots and extending transversely thereof in a horizontal plane, a plurality of rods carried by said bar, swivel joints connected to said rods, and elongated cylindrical covering elements connected to certain of said swivel joints and adapted to drag along the ground rearwardly of said seed boots whereby to cover furrows.

In testimony whereof, I affix my signature in the presence of two witnesses.

ALBERT C. LARSON.

Witnesses:
J. A. FLEMING,
M. W. CARR.

Copies of this patent may be obtained for five cents each, by addressing the "Commissioner of Patents, Washington, D. C."